(12) United States Patent
Laabs et al.

(10) Patent No.: US 11,953,583 B2
(45) Date of Patent: Apr. 9, 2024

(54) RADAR ASSEMBLY AND METHOD FOR OPERATING A RADAR ASSEMBLY

(71) Applicant: Altavo GmbH, Dresden (DE)

(72) Inventors: Martin Laabs, Dresden (DE); Dirk Plettemeier, Dresden (DE)

(73) Assignee: Technische Universität Dresden, Dresden (DE)

( * ) Notice: Subject to any disclaimer, the term of this patent is extended or adjusted under 35 U.S.C. 154(b) by 551 days.

(21) Appl. No.: 17/253,881

(22) PCT Filed: May 14, 2019

(86) PCT No.: PCT/DE2019/100436
§ 371 (c)(1),
(2) Date: Dec. 18, 2020

(87) PCT Pub. No.: WO2019/242794
PCT Pub. Date: Dec. 26, 2019

(65) Prior Publication Data
US 2021/0270953 A1    Sep. 2, 2021

(30) Foreign Application Priority Data

Jun. 22, 2018   (DE) .................... 10 2018 115 079.2

(51) Int. Cl.
*G01S 13/34* (2006.01)
*G01S 7/03* (2006.01)
*G01S 7/35* (2006.01)

(52) U.S. Cl.
CPC .............. *G01S 13/347* (2013.01); *G01S 7/03* (2013.01); *G01S 7/35* (2013.01)

(58) Field of Classification Search
CPC . G01S 7/03; G01S 7/032; G01S 7/352; G01S 7/35; G01S 7/282; G01S 7/285; G01S 13/347; G01S 13/0209

(Continued)

(56) References Cited

U.S. PATENT DOCUMENTS 3,500,303 A * 3/1970 Johnson .................... H01Q 3/42
                                                      367/126
3,631,490 A * 12/1971 Palmieri ............... G01S 7/2923
                                                      702/191

(Continued)

FOREIGN PATENT DOCUMENTS

DE          197 48 608 A1    5/1999
WO          WO 99/35510 A1   7/1999

OTHER PUBLICATIONS

International Search Report issued by the European Patent Office in International Application PCT/DE2019/100436.

(Continued)

*Primary Examiner* — Vladimir Magloire
*Assistant Examiner* — Michael W Justice
(74) *Attorney, Agent, or Firm* — Ursula B. Day (57) ABSTRACT

A radar assembly and a method for operating the radar assembly is disclosed, where a first frequency comb generator is arranged in the transmitting unit between the first oscillator and the transmitting antenna and a second frequency comb generator is arranged in the receiving unit between the second oscillator and the first mixer. On the transmitter side a first frequency comb generator is controlled with the first oscillator frequency in order to generate a primary signal containing a plurality of frequency components, on the receiver side a second frequency comb generator is controlled with a second oscillator frequency in order to generate an output signal containing a plurality of frequency components, the output signal generated in such a way is mixed with a third oscillator frequency, and the intermediate frequency is generated by mixing the received reflected signal with the mixed signal.

12 Claims, 4 Drawing Sheets

(58) Field of Classification Search
USPC .......... 324/175, 129; 327/119; 342/175, 129
See application file for complete search history.

(56) References Cited

U.S. PATENT DOCUMENTS

| | | | | | |
|---|---|---|---|---|---|
| 3,885,240 | A | * | 5/1975 | Jensen | G01S 13/64 342/106 |
| 3,894,293 | A | * | 7/1975 | Jensen | G01S 13/64 342/111 |
| 3,928,851 | A | * | 12/1975 | Jensen | G01S 13/64 342/111 |
| 3,939,474 | A | * | 2/1976 | Coleman | G01S 13/26 342/202 |
| 4,504,833 | A | * | 3/1985 | Fowler | G01S 13/106 342/194 |
| 4,982,165 | A | * | 1/1991 | Lowenschuss | G01S 7/38 327/39 |
| 4,983,978 | A | * | 1/1991 | Levinson | G01S 13/38 331/18 |
| 5,119,035 | A | * | 6/1992 | Goy | G01R 27/32 324/633 |
| 5,146,616 | A | * | 9/1992 | Tang | G01S 13/0209 455/119 |
| 5,239,309 | A | * | 8/1993 | Tang | G01S 13/24 342/60 |
| 5,241,561 | A | * | 8/1993 | Barnard | H04B 1/707 375/147 |
| 5,307,341 | A | * | 4/1994 | Yates | H04B 7/216 370/320 |
| 5,729,570 | A | * | 3/1998 | Magill | H04B 1/7085 370/204 |
| 5,784,403 | A | * | 7/1998 | Scott | H04B 1/70712 375/151 |
| 5,923,280 | A | * | 7/1999 | Farmer | G01S 13/931 342/72 |
| 5,969,667 | A | * | 10/1999 | Farmer | G01S 7/038 342/194 |
| 6,002,707 | A | * | 12/1999 | Thue | G01S 13/325 342/134 |
| 6,085,151 | A | * | 7/2000 | Farmer | G01S 7/0234 701/96 |
| 6,385,266 | B1 | * | 5/2002 | Haberle | H03L 7/091 327/119 |
| 6,570,458 | B2 | * | 5/2003 | Cuddy | G01R 31/2837 331/37 |
| 8,891,599 | B2 | * | 11/2014 | Nakasha | G01S 7/282 375/221 |
| 10,018,714 | B2 | * | 7/2018 | Liao | G01S 7/285 |
| 10,560,110 | B1 | * | 2/2020 | Regazzi | H04B 1/0475 |
| 2002/0196088 | A1 | * | 12/2002 | Cuddy | G01R 31/2837 331/38 |
| 2012/0027057 | A1 | * | 2/2012 | Nakasha | G01S 13/24 375/219 |
| 2018/0000003 | A1 | * | 1/2018 | Evans | A01B 73/067 |
| 2018/0074179 | A1 | * | 3/2018 | Liao | G01S 13/887 |

OTHER PUBLICATIONS

Translation of International Search Report issued by the European Patent Office in International Application PCT/DE2019/100436.

* cited by examiner

Fig. 1

Prior Art

RADAR ASSEMBLY AND METHOD FOR OPERATING A RADAR ASSEMBLY

CROSS-REFERENCES TO RELATED APPLICATIONS

This application is the U.S. National Stage of International Application No. PCT/DE2019/100438, which designated the United States and has been published as International Publication No. WO 2019/242794 A1 and which claims the priority of German Patent Application, Serial No. DE 10 2018 115 079.2, filed Jun. 22, 2018, pursuant to 35 U.S.C. 119(a) (d) the description of which is hereby incorporated by reference.

BACKGROUND OF THE INVENTION

The invention relates to a radar assembly, comprising a transmitter unit with a first oscillator as well as a transmitting antenna and a receiver unit with a second oscillator, a first mixer and a receiving antenna.

The invention also relates to a method for operating a radar assembly, whereby a first oscillator frequency is provided, from which a primary signal is at least indirectly generated and emitted via a transmitting antenna, and whereby a second oscillator frequency is provided, from which an intermediate frequency is at least indirectly generated by mixing a received reflected signal with the second oscillator frequency.

The term radar (radio detection and ranging; RADAR) usually refers to detection or location processes which work based on so-called electromagnetic waves in the radio frequency range.

The electromagnetic waves generated in a transmitter unit of a radar assembly are bundled and transmitted by a suitable antenna as a so-called primary signal. This primary signal is reflected by objects which are located in the direction of the emitted primary signal and received as a so-called echo or reflected signal by an antenna of a receiver unit. The received reflected signal can then be evaluated or analyzed according to various criteria. In this way, information about objects, such as their distance, their position or angle, their direction of movement and speed and/or properties of the objects, can be obtained.

Various methods and systems in the field of radar technology are known in the art. The radar devices are divided into, for example, primary radar devices for non-cooperative targets or objects and secondary radar devices for cooperative targets or objects. The group of primary radar devices is further subdivided into pulse radar assemblies and continuous wave radar assemblies.

For example, continuous wave (CW) radar assemblies are known which are widely used particularly in sensor applications. In contrast to pulse radar assemblies, continuous signals are used in continuous wave radar assemblies. It is also known to change the frequency of these continuous signals. According to the prior art, the pulse is usually shaped synthetically during subsequent signal processing.

Radar systems working with frequency steps (Frequency Stepped Continuous Wave—FSCW) are also known. Such radar systems can achieve a very high level of accuracy, since the signals can be evaluated with the correct phase. A disadvantage of such systems is that each frequency for the primary signal to be generated has to be generated and switched individually. In addition, after each switchover, it is necessary to wait until a stable system state has established itself before the reflected signal can be properly evaluated by the receiver unit. The FSCW system is therefore only suitable to a limited extent for radar applications that require a high measurement speed, as the measurement time of these systems is relatively long.

Prior art FSCW systems work by using a frequency generator which sequentially generates different frequencies required one after the other. The primary signals generated by this generator or frequency generator are emitted sequentially via an antenna of the transmitter unit, reflected by an object or target and received as the reflected signal by an antenna of a receiver unit. In this receiver unit, the received, reflected signal is converted to a constant intermediate frequency ZF, for example by means of a frequency mixer. In a special case, this intermediate frequency can also be 0 Hz.

The further processing of the received and converted reflected signal, which may include, for example, phase and amplitude estimation, pulse shaping using a Fourier transformation and other processes, usually occurs after analog-to-digital conversion of the intermediate frequency signal. This converted, digital intermediate frequency signal can be processed further using known methods for digital signal processing. For the synthetic pulse shaping necessary with such an FSCW system, several frequency steps, for example more than 100 frequency steps, have to be performed.

Each individual frequency step requires switching the frequency generators in the transmitter unit and in the receiver unit at the same time, for example. In addition, the radar assembly must be in a steady state both in the transmitter unit and in the receiver unit. This includes, for example, complete propagation of the signal and the decay of transient signals in the filters. This process must be repeated several hundred times depending on the required uniqueness range. The required measurement time with such a radar assembly is therefore relatively long.

The disadvantage of this solution is that the frequencies required to detect or locate objects have to be sequentially generated with a frequency generator and that a high-quality measurement result for each of these frequencies can only be expected after a so-called settling time has elapsed. Such a detection or location process for achieving a corresponding measurement accuracy is very time-consuming.

Starting from prior art, there is a need for an improved radar assembly and a corresponding method for operating a radar assembly, with which a measurement can be performed in a shorter time or a shorter measurement time.

SUMMARY OF THE INVENTION

It is thus the object of the invention to specify a radar assembly and a method for operating a radar assembly, with which a reduction in the necessary measurement time is achieved. In addition, a solution is to be created with which the technical effort and costs in the manufacture of a radar assembly are reduced. In addition, the quality of the transmission signal or the primary signal should be improved.

The object is achieved with an assembly having the features according to claim 1 of the independent claims. Further embodiments are recited in the dependent claims 2 to 6.

The object is also achieved with a method having the features according to claim 7 of the independent claims. Further embodiments are recited in the dependent claims 8 to 13.

Instead of sequentially generating and emitting individual frequencies for the primary signal, according to the present invention, two or more frequencies for the primary signal are generated and emitted simultaneously. The primary signal thus contains two or more frequency components.

For this purpose, a device for simultaneously generating two or more frequencies in the radar assembly is used both on the transmitter side and on the receiver side. This device for simultaneously generating several frequencies generates a primary signal which contains several frequency components necessary for a high-quality measurement of the properties of an object or target.

This device can, for example, be a so-called frequency comb generator.

In an exemplary embodiment, such a frequency comb generator may be constructed, for example, of step recovery diodes, which upon excitation with an oscillator frequency f produce an output spectrum with frequency components of $$n \times f; n=[s \ldots e]; s,e \in \mathbb{Z}$$

Such a frequency comb generator is arranged both in the transmitter unit and in the receiver unit of a radar assembly according to the invention.

It is provided that the mutual frequency spacing of the individual frequency components of the spectrum of the primary signal generated in the transmitter unit is always identical. The frequency spacing is thus equidistant.

This primary signal generated with such a frequency comb generator, which is composed of at least two different frequencies or frequency components, is emitted via a transmitting antenna of the transmitter unit, reflected from an object or target and received via a further antenna, a receiving antenna, in a receiver unit as a reflected signal.

In the receiver unit of the radar assembly, the received, reflected signal is mixed, for example, with a mixed signal of the form $$n \times (f+\Delta f); n=[s \ldots e]; s,e \in \mathbb{Z}$$

Here, n is the number of different frequencies f or rather frequency components and $\Delta f$ is the frequency spacing between the different frequencies or frequency components of the mixed signal to be generated. Such a mixed signal is often referred to as a local oscillator signal.

A special feature of this mixed signal, while the frequency spacing between the individual frequency components of the mixed signal is also equidistant, it is not identical to the frequencies of the individual frequency components of the primary signal. A frequency shift of the frequency components exists between the frequency components of the primary signal and the frequency components of the mixed signal. In one example, the frequency components of the mixed signal are shifted towards higher frequencies with respect to the frequency components of the primary signal. Such a shift can be, for example, 50 MHz or 0.5 MHz.

After this frequency mixing, an intermediate frequency signal ZF with frequency components of $$n \times \Delta f; n=[s \ldots e]; s,e \in \mathbb{Z}$$

is produced. In contrast to known CW radar systems, the intermediate frequency signal is no longer narrowband, but contains at least two signals at different frequencies. It is contemplated to generate the mixed signal by using the second frequency comb generator arranged in the receiver unit of the radar assembly. It is also contemplated to use devices known from the prior art, such as a band-bass filter and a frequency mixer, for generating the mixed signal.

The components f, $\Delta f$, s and e should be selected so as to prevent the generation of intermodulation products of the carriers $a \times f$ and $b \times (f+\Delta f)$, $a \neq b$, $[a,b] \in \mathbb{Z}$ in the intermediate frequency signal or the intermediate frequency ZF produced at the desired frequencies $n \times \Delta f$ after mixing. This is guaranteed, for example, when the frequency spacing of the carriers in the transmission signal is less than $\frac{1}{2} \ast e \times \Delta f$.

Thus, the invention provides a possibility to generate, emit and then receive many frequency components in parallel with little effort, and to subsequently separate and analyze these frequency components by preferably digital signal processing.

With this analysis, properties of the object or the target such as distance, position or angle, direction of movement can be determined. In addition, the material composition, density and other physical properties of the object can be determined.

The invention can be used, for example, in the field of automotive radar when a high measurement speed is required.

In addition, the present invention can also be used in the field of material flow analysis, for example in the fields of agriculture or industry. In particular, rapidly moving substances can be monitored with a radar assembly for quality assurance and process optimization. Such rapidly moving substances can, for example, be substances moving in an air stream in or outside a tube. In a special application, for example, the moisture content in a moving material such as a grain can be determined in this way.

In addition, the location and/or speed of very fast objects can be determined. Such an object can be for example a projectile.

The invention can potentially also be used in radar devices for autonomous or semi-autonomous vehicles. Here, the invention can represent a supplement or a replacement for existing, conventional systems such as LIDAR or camera-based sensor systems.

Furthermore, the signal quality, in particular the phase noise, of the primary signals generated with a frequency comb generator in a transmitter unit of a radar assembly according to the invention can also be expected to be higher than when using a phase-locked loop (PLL) according to the prior art.

The previously explained features and advantages of this invention can be better understood and evaluated after carefully studying the following detailed description of the preferred, non-limiting example embodiments of the invention in conjunction with the accompanying drawings, which show in:

DETAILED DESCRIPTION OF PREFERRED EMBODIMENTS

Figure 1:
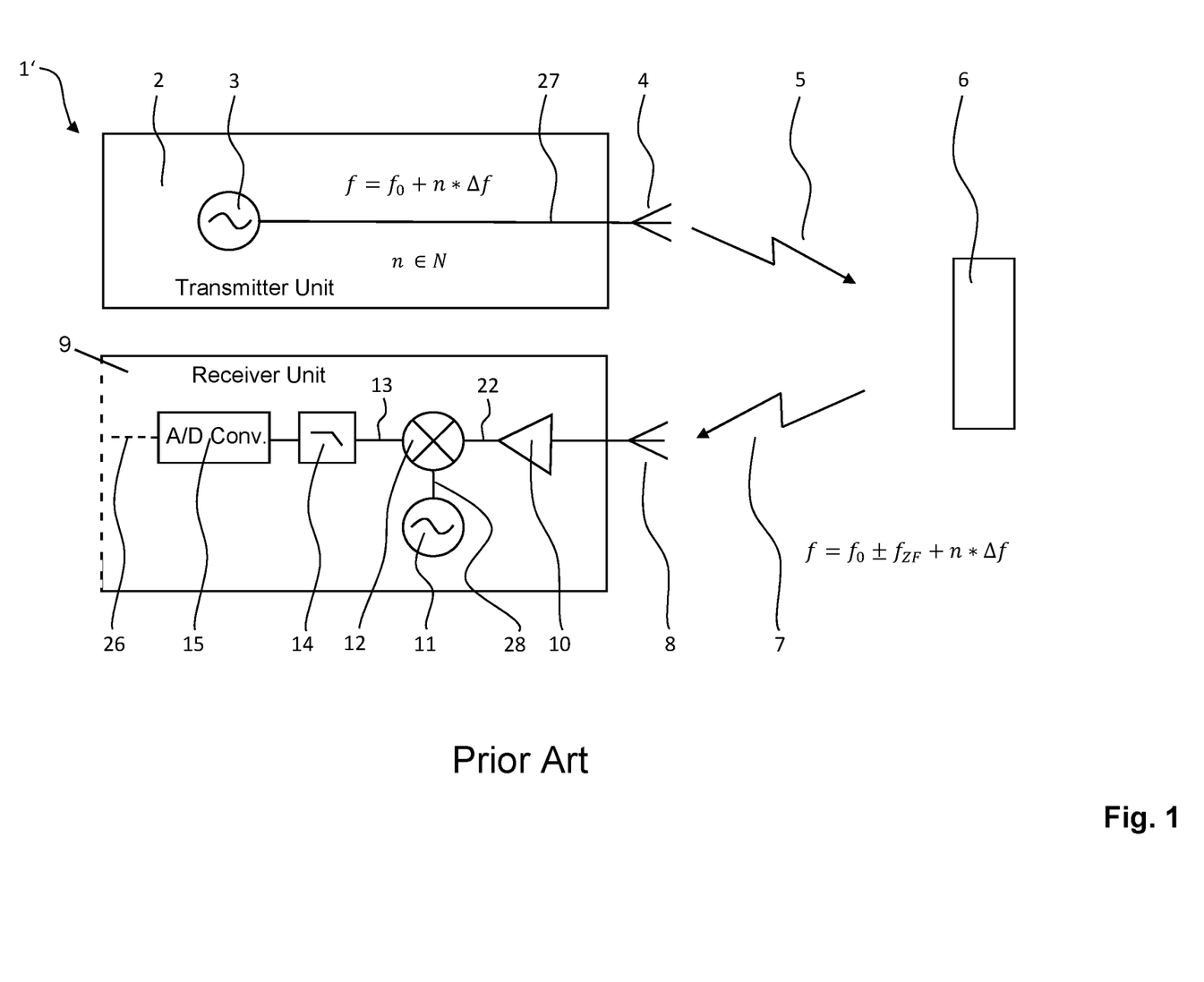
FIG. 1: a block diagram of an FSCW radar system according to the prior art.

FIG. 1 shows a block diagram of a prior art FSCW radar assembly 1', depicting only the blocks of the radar assembly 1' essential for the description. The radar assembly 1' includes a transmitter unit 2, in which, for example, a phase locked loop PLL is arranged as a first oscillator 3. This phase-locked loop 3 is used to generate a first adjustable oscillator frequency 27 for the primary signal 5, which is emitted from the transmitter unit 2 via the transmitting antenna 4. The emitted primary signal 5 reaches the object or target 6, from which at least part of the signal energy of the primary signal 5 is reflected in such a way that this part of the signal energy reaches the receiving antenna 8 of a receiver unit 9 as a so-called reflected signal 7.

According to the prior art, the received, reflected signal 7 is amplified for example by an input amplifier 10, producing an amplified, high-frequency reflected signal 22 which is supplied to an input of a mixer 12. A second oscillator 11 producing a mixing frequency or a second oscillator frequency 28 is connected to a second input of the mixer 12, with the mixer 12 converting the amplified, high-frequency reflected signal 22 to an intermediate frequency 13.

This intermediate frequency 13 can then be filtered by a first band filter 14 and converted into a digital signal in an analog-digital converter 15. The thereby produced digital signal or digital intermediate frequency signal 26 is further processed or analyzed in a further unit, not shown in FIG. 1. In this analysis, properties of the object or of the target 6 such as, for example, distance, position or angle, direction of movement are determined.

According to the prior art, it is provided that several different first oscillator frequencies 27 for the primary signal 5 have to be generated sequentially in the first oscillator 3. For example, the following relationship applies:

$$f=f_0+n\cdot\Delta f.$$

According to this prior art, several different second mixing frequencies or second oscillator frequencies 28 must be generated sequentially by the second oscillator 11 in order to generate the intermediate frequency 13 in the mixer 12, for example according to the relationship:

$$f=f_0\pm f_{ZF}+n\cdot\Delta f.$$

Figure 2:
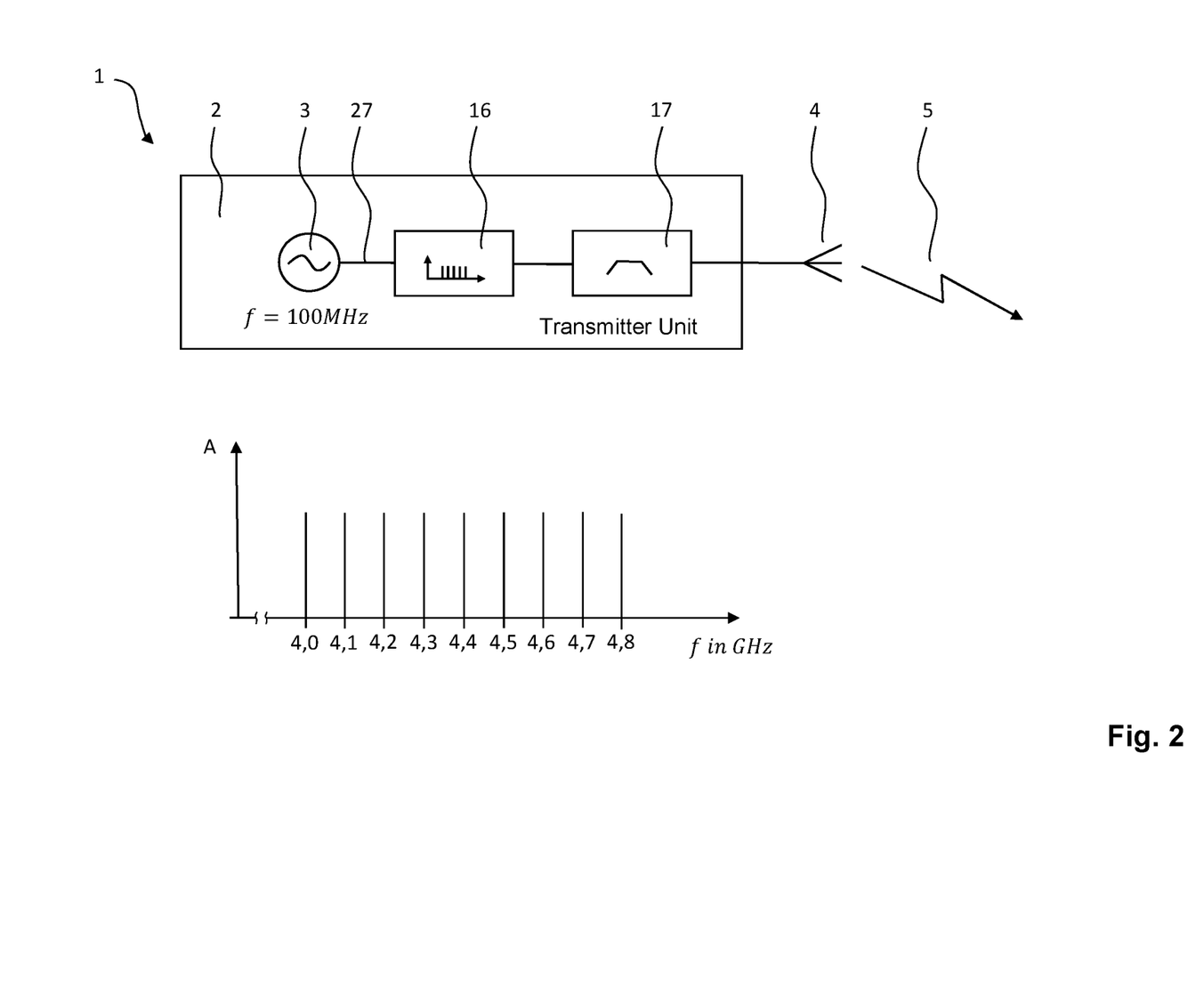
FIG. 2: a transmission arrangement of an FSCW radar system according to the invention with a first frequency comb generator.

FIG. 2 shows a transmitter unit 2 of an FSCW radar system 1 according to the invention with a first frequency comb generator 16. The transmitter unit 2 has a first oscillator 3 for generating a first oscillator frequency 27 which controls the first frequency comb generator 16.

Such a frequency comb generator is implemented using a non-linear electronic component. This is accomplished, for example, by using a step recovery diode, a non-linear transmission line, which can be implemented, for example, by a line having at least two suitably spaced diodes, or by utilizing electrical avalanche effects in transistors.

The first frequency comb generator 16 provides at its output a primary signal 5 with several equidistant frequency components. The primary signal 5 generated in this way is filtered via a second bandpass filter 17 and emitted via the transmitting antenna 4 of the transmitter unit 2.

By way of example, several mutually equidistant frequency components of the generated output spectrum of the primary signal 5 are shown in a frequency-amplitude diagram. The example in FIG. 2 shows that the first oscillator 3 generates a first oscillator frequency 27 f of 100 MHz.

The first frequency comb generator 16, which is controlled by this oscillator frequency 27 f of 100 MHz, provides in a combination with the third band filter 19 or band pass filter 19, for example, at its output several mutually equidistant frequency components at the positions 4.0 GHz, 4.1 GHz, 4.2 GHz, 4.3 GHz, 4.4 GHz, 4.5 GHZ, 4.6 GHz, 4.7 GHz and 4.8 GHz. The primary signal 5 generated in this way and emitted by the transmitting antenna 4 thus contains at the same time nine frequency components. With the present invention, these nine frequency components are emitted as a primary signal 5 within a single measurement cycle. According to the state of the art, nine sequentially executed measurement cycles would be required. The radar assembly according to the invention can thus realize the nine measurements to be carried out in one ninth of the measurement time compared to the prior art.

Figure 3:
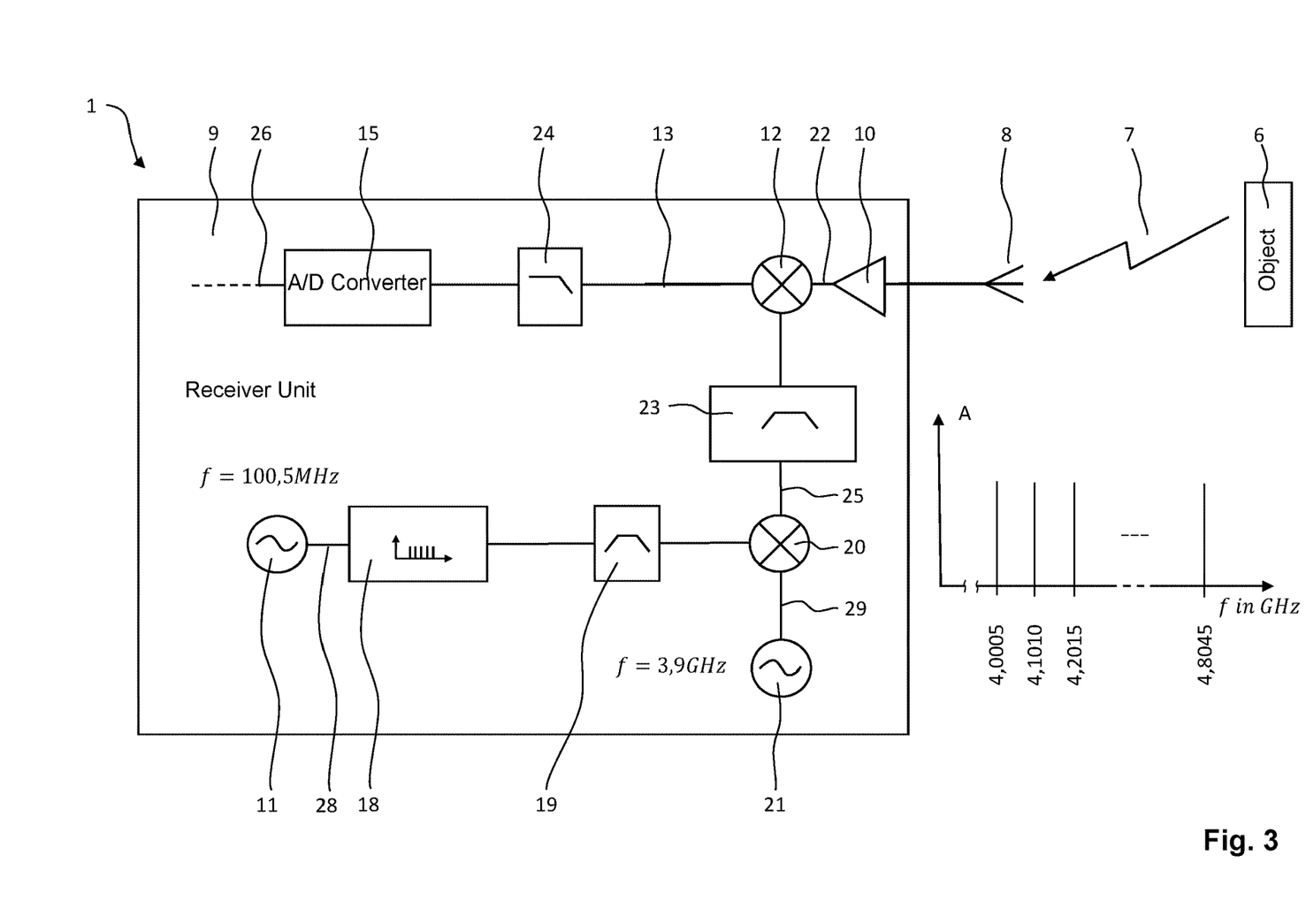
FIG. 3: a receiving arrangement of an FSCW radar system according to the invention with a second frequency comb generator.

FIG. 3 shows a receiver unit 9 according to the invention of an FSCW radar system 1 according to the invention with a second frequency comb generator 18. A second oscillator 11 is also arranged in the receiver unit 9, which generates a second oscillator frequency 28 that controls the second frequency comb generator 18. A signal containing several frequency components is likewise generated by the second frequency comb generator 18. This signal, which contains a plurality of frequency components, is supplied to a first input of a second mixer 20. A second input of the second mixer 20 is connected to a third oscillator 21, which provides a third oscillator frequency 29, for example 3.9 GHz, for the second mixer 20.

Optionally, the bandwidth of the signal containing a plurality of frequency components may be limited by a third band filter 19 before being supplied to the first input of the second mixer 20.

The second mixer 20 generates at its output a mixed product or a mixed signal 25, which is supplied to a first input of the first mixer 12. The bandwidth of this mixed signal 25 can also be limited by a fourth band filter 23 before being supplied to the first input of the first mixer 12.

A high-frequency, reflected signal 7 reflected by an object or target 6 is received by a receiving antenna 8, is amplified by an input amplifier 10, and arrives as an amplified, high-frequency reflected signal 22 at the second input of the first mixer 12.

In the first mixer 12, an intermediate frequency IF 13 is generated from the amplified, high-frequency reflected signal 22 and the mixed signal 25 generated by the second mixer 20. The intermediate frequency 13 has a significantly lower frequency than the amplified, high-frequency reflected signal 22. In one example, a subcarrier of this intermediate frequency 13 may conceivably be 0 Hz. As is customary in the prior art, this intermediate frequency 13 is converted into a digital intermediate frequency signal 26 by using an analog-to-digital converter 15 and further processed or analyzed in the receiver unit 9 in an arrangement (not shown in FIG. 3) for further signal processing. In this analysis, information about the object or target 6 is obtained, such as its distance, its position or angle, its direction of movement and speed. In addition, inherent properties of the objects or targets 6, such as their material composition or their moisture content and the like, can also be determined.

Optionally, the bandwidth of the intermediate frequency 13 can be limited by a fifth band filter 24 before conversion into a digital intermediate frequency signal 26 by the analog-to-digital converter 15.

In the exemplary embodiment of the invention shown in FIG. 3, the second oscillator 11 may provide a second oscillator frequency 28 of 100.5 MHz as a control signal for the second frequency comb generator 18. The third oscillator 21 generates a third oscillator frequency 29 of 3.9 GHz. With this constellation, the mixed signal 25 supplied to the first input of the first mixer 12 contains several frequency components, as shown in the frequency-amplitude diagram in FIG. 3. In the described constellation, these frequency components are 4.0005 GHz, 4.1010 GHz, 4.2015 GHz, 4.3020 GHz, 4.4025 GHz, 4.5030 GHz, 4.6035 GHz, 4.7040 GHz and 4.8045 GHz. These frequency components generated by the second frequency comb generator 18 are mutually equidistant, like the frequency components generated by the first frequency comb generator 16 in the transmitter unit 2. In this example, the frequency components generated by the second frequency comb generator 18 have a slightly larger spacing from one another, in the example 0.5 MHz more, with a mutual spacing of the frequency components of the second frequency comb generator 18 of 100.5 MHz.

These different distances between the frequency components in the mixed signal 25 are necessary so that the individual frequency components in the first mixer 12 do not inextricably overlap to form a single intermediate frequency 13, but are instead generated as an intermediate frequency comb with a small frequency separation between the frequency components contained in this intermediate frequency comb. In the described constellation, these frequency components are 0.0005 GHz, 0.0010 GHz, 0.0015 GHz, 0.0020 GHz, 0.0025 GHz, 0.0030 GHz, 0.0035 GHz, 0.0040 GHz.

Figure 4A:
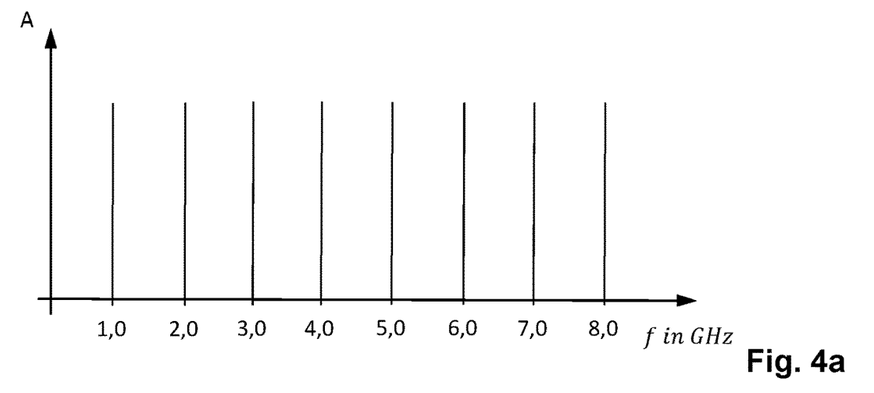
FIG. 4*a*: a diagram of an idealized frequency-amplitude spectrum of a primary signal and a reflected signal with exemplary frequency information for the present invention.

FIG. 4a shows a diagram of an idealized frequency-amplitude spectrum of a transmission and reception signal (TX/RX signal) with exemplary frequency information for the present invention with reference to a second exemplary embodiment.

The depicted frequency-amplitude diagram shows by way of example eight frequency components of the primary signal 5. In the example in FIG. 4a, these frequency components are mutually equidistant at the frequencies 1.0 GHz, 2.0 GHz, 3.0 GHz, 4.0 GHz, 5.0 GHz, 6.0 GHz, 7.0 GHz and 8.0 GHz. The primary signal 5 generated in this way is emitted via the transmitting antenna 4 of the transmitter unit 2. Signal components that are reflected by an object or target 6 and received as a reflected signal 7 via the receiving antenna 8 of a receiver unit 9 have the same frequency components and thus the same frequency-amplitude curve, with their amplitudes being mostly different from one another and significantly smaller. In this example, the first oscillator 3 provides a first oscillator frequency 27 of 1.0 GHz.

Figure 4B:
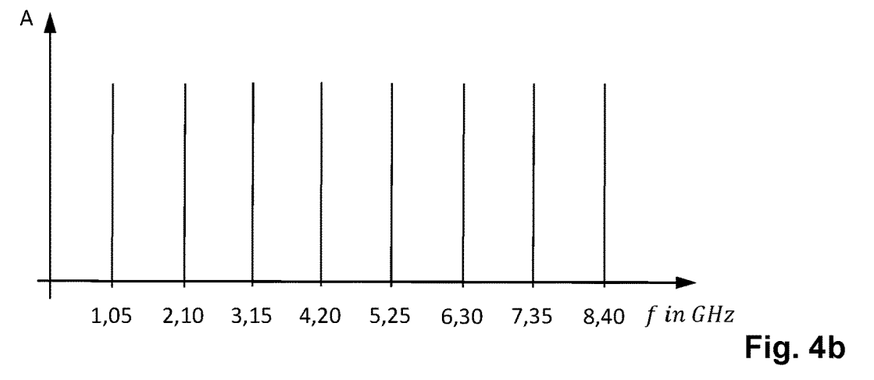
FIG. 4*b*: a diagram of an idealized frequency-amplitude spectrum of a mixed signal for a receiver according to the invention with exemplary frequency information for the present invention.

FIG. 4b shows a diagram of an idealized frequency-amplitude spectrum of a mixed signal 25 for a receiver unit 9 according to the invention in a radar assembly 1 with exemplary frequency information for the present invention.

A special mixed signal 25 is required for generating an intermediate frequency signal 13 in the receiver unit 9, which is generated in a second mixer 20 using the second frequency comb generator 18 and a mixture of the output signal generated by the second frequency comb generator 18 with a third oscillator frequency 29. This mixed signal 25 is, after being filtered in the fourth bandpass filter 23, depicted in FIG. 4b in idealized form by way of example with the frequencies 1.05 GHz, 2.10 GHz, 3.15 GHz, 4.20 GHz, 5.25 GHz, 6.30 GHz, 7.35 GHz and 8.40 GHz. For this purpose, the second oscillator 11 provides a second oscillator frequency 28 of 50.0 MHz and the third oscillator 21 provides a third oscillator frequency 29 of 1.0 GHz.

Figure 4C:
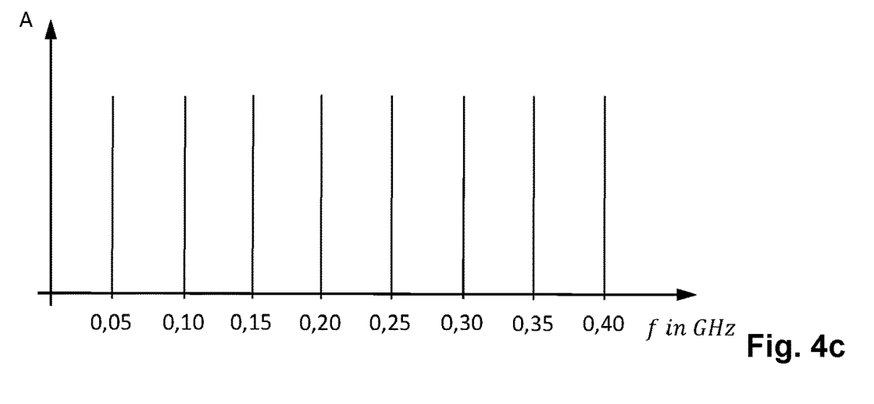
FIG. 4*c*: a diagram of an idealized frequency-amplitude spectrum of an intermediate frequency signal for a receiver according to the invention.

FIG. 4c depicts a diagram of an idealized frequency-amplitude spectrum of an intermediate frequency signal 13 for a receiver unit 9 according to the invention.

When the received, reflected signal 7 is processed with the mixed signal 25 in a first mixer of the receiver unit 9, the intermediate frequency signal 13 shown in FIG. 4c is generated.

The intermediate frequency signal 13 in this case has the frequencies 0.05 GHz, 0.10 GHz, 0.15 GHz, 0.20 GHz, 0.25 GHz, 0.30 GHz, 0.35 GHz and 0.40 GHz, for example.

The particular intermediate frequency signal 13 is used to determine the information about an object or target, such as its distance, position or angle, direction of movement and speed and/or properties of the objects or targets.

In a practical implementation of the invention, an additional reference receiver may be arranged, which is operated identically to the receiver unit 9, but without an antenna, i.e. instead by directly coupling of the primary signal 5. The second received signal generated by this reference receiver, the second intermediate frequency signal or the second digital intermediate frequency signal, can be compared with the reflected signal 7 from the target 6, the intermediate frequency signal 13 or the digital intermediate frequency signal 26 and be used to improve the quality of the signal processing, as is known from the prior art.

The method on which this description is based can be modified by a person skilled in the art and transferred to, for example, also to detection or location methods that work with optical or acoustic signals. In this way, for example, two or more optical or acoustic frequency components can be generated for a primary signal of a detection or location method. A limitation of the usable frequency range to only electromagnetic waves in the radio frequency range is not intended.

What is claimed is:

1. A radar assembly, comprising a transmitter unit with a first oscillator and a transmitter antenna, and a receiver unit with a second oscillator, a first mixer and a receiver antenna, comprising:
    a first frequency comb generator arranged in the transmitter unit between the first oscillator and the transmitter antenna, said first frequency comb generator generating a plurality of mutually equidistant first frequency components, and
    a second frequency comb generator arranged in the receiver unit between the second oscillator and the first mixer, said second frequency comb generator generating a plurality of mutually equidistant second frequency components that are frequency-shifted with respect to the first frequency components and do not include any one of the first frequency components.

2. The radar assembly according to claim 1, further comprising a second mixer arranged in the receiver unit between the second frequency comb generator and the first mixer, with the second mixer being connected to a third oscillator.

3. The radar assembly according to claim 2, further comprising a second band filter arranged in the transmitter unit between the first frequency comb generator and the transmitting antenna.

4. The radar assembly according to claim 3, further comprising a third band filter arranged between the second frequency comb generator and the second mixer.

5. The radar assembly according to claim 4, further comprising a fourth band filter arranged between the second mixer and the first mixer.

6. The radar assembly according to claim 1, wherein an output of the first mixer is connected to an input of an analog-to-digital converter, and wherein the analog-to-digital converter has an output for outputting a digital intermediate frequency signal.

7. A method for operating a radar assembly comprising,
on the transmitter side, controlling with a first oscillator frequency a first frequency comb generator, generating at least indirectly from the first oscillator frequency a primary signal containing a plurality of mutually equidistant first frequency components, and emitting the signal via a transmitting antenna,
generating an intermediate frequency at least indirectly from a second oscillator frequency by mixing a received reflected signal with the second oscillator frequency,
on the receiver side, controlling with the second oscillator frequency a second frequency comb generator for generating an output signal containing a plurality of mutually equidistant second frequency components that are frequency-shifted with respect to the first frequency components and do not include any one of the first frequency components,
mixing the output signal generated in this manner with a third oscillator frequency and generating therefrom a mixed signal, and
generating the intermediate frequency by mixing the received, reflected signal with the mixed signal.

8. The method according to claim 7, further comprising filtering the primary signal generated by the first frequency comb generator by a second band filter before emitting the filtered primary signal via a transmitting antenna.

9. The method according to claim 8, further comprising filtering the output signal of the second frequency comb generator containing a plurality of second frequency components by a third band filter before being mixed with the third oscillator frequency.

10. The method according to claim 9, further comprising filtering the mixed signal by a fourth band filter before being mixed with the received, reflected signal.

11. The method according to claim 9, further comprising converting the intermediate frequency into a digital intermediate frequency signal by an analog-to-digital converter and outputting the digital intermediate frequency signal for further processing or analysis.

12. The method according to claim 11, wherein the further processing or analysis of the digital intermediate frequency signal is carried out in the radar assembly, thereby determining information about objects, such as their distance, their position or angle, their direction of movement and speed and/or properties of the objects.

* * * * *

UNITED STATES PATENT AND TRADEMARK OFFICE
CERTIFICATE OF CORRECTION

| | | |
|---|---|---|
| PATENT NO. | : 11,953,583 B2 | Page 1 of 1 |
| APPLICATION NO. | : 17/253881 | |
| DATED | : April 9, 2024 | |
| INVENTOR(S) | : Martin Laabs and Dirk Plettemeier | |

It is certified that error appears in the above-identified patent and that said Letters Patent is hereby corrected as shown below:

On the Title Page

Item (73) Replace "Technische Universität Dresden, Dresden (DE)" with --ALTAVO GmbH, Dresden (DE)--

Signed and Sealed this
Twenty-fourth Day of June, 2025

Coke Morgan Stewart
*Acting Director of the United States Patent and Trademark Office*